(12) United States Patent
Kageyama et al.

(10) Patent No.: US 10,000,343 B2
(45) Date of Patent: Jun. 19, 2018

(54) VIBRATORY CONVEYING APPARATUS COMPRISING TROUGH ATTACHMENT/DETACHMENT MECHANISM, AND COMBINATION WEIGHING APPARATUS

(71) Applicant: ISHIDA CO., LTD., Kyoto (JP)

(72) Inventors: Toshiharu Kageyama, Ritto (JP); Toshikazu Shimada, Ritto (JP); Takakazu Moriwaki, Ritto (JP)

(73) Assignee: ISHIDA CO., LTD., Kyoto (JP)

( * ) Notice: Subject to any disclaimer, the term of this patent is extended or adjusted under 35 U.S.C. 154(b) by 0 days. days.

(21) Appl. No.: 15/510,101

(22) PCT Filed: Sep. 18, 2015

(86) PCT No.: PCT/JP2015/076806
§ 371 (c)(1),
(2) Date: Mar. 9, 2017

(87) PCT Pub. No.: WO2016/043332
PCT Pub. Date: Mar. 24, 2016

(65) Prior Publication Data
US 2017/0297826 A1    Oct. 19, 2017

(30) Foreign Application Priority Data

Sep. 19, 2014 (JP) .................................. 2014-191055
Sep. 19, 2014 (JP) .................................. 2014-191057

(51) Int. Cl.
*B65G 27/06* (2006.01)
*B65G 27/08* (2006.01)
(Continued)

(52) U.S. Cl.
CPC ............. *B65G 27/08* (2013.01); *B65G 27/16* (2013.01); *F16B 2/185* (2013.01); *B65G 2203/0258* (2013.01)

(58) Field of Classification Search
CPC ......... B65G 27/00; B65G 27/06; B65G 27/08
(Continued)

(56) References Cited

U.S. PATENT DOCUMENTS 1,930,884 A * 10/1933 Pardini ................. B65G 27/00
198/758
1,983,484 A * 12/1934 Nyborg ................ B65G 27/00
198/758
(Continued)

FOREIGN PATENT DOCUMENTS

EP    0 577 851 A1    1/1994
EP    1 961 681 A1    8/2008
(Continued)

OTHER PUBLICATIONS

International Search Report issued in PCT/JP2015/076806; dated Dec. 15, 2015.
(Continued)

*Primary Examiner* — James R Bidwll
(74) *Attorney, Agent, or Firm* — Studebaker & Brackett PC

(57) ABSTRACT

A vibratory conveying apparatus (10) comprises a trough (20) for conveying articles from an upstream side to a downstream side, a vibrator (30) for vibrating the trough (20), and an attachment/detachment mechanism (40) for attaching and detaching the trough (20) and the vibrator (30). The attachment/detachment mechanism (40) has a trough-side attachment/detachment member (50), a vibrator-side attachment/detachment member (70), and a lever (65). The trough-side attachment/detachment member (50),
(Continued)

which is secured to a trough bottom plate (21), has a protruding part (55) disposed on the upstream side and an eccentric cam (66) disposed on the downstream side. The vibrator-side attachment/detachment member (70), which is secured to the vibrator (30), has a protruding part (72) disposed on the upstream side and a bent part (73) disposed on the downstream side. The lever (65) is configured to be moved up and down to switch between a fixed state in which the trough-side attachment/detachment member (50) and the vibrator-side attachment/detachment member (70) are fixed to each other, and a separated state in which the two members are separated from each other.

<p align="center">20 Claims, 13 Drawing Sheets</p>

(51) Int. Cl.
*B65G 27/16* (2006.01)
*F16B 2/18* (2006.01)
*B65G 27/00* (2006.01)

(58) Field of Classification Search
USPC .................................. 198/752.1, 758, 771
See application file for complete search history.

(56) References Cited

U.S. PATENT DOCUMENTS 2,204,770 A * 6/1940 Rankin .................. B65G 65/00
198/758
2,464,344 A * 3/1949 Pratt ...................... B65G 27/00
198/758
5,773,765 A * 6/1998 Sashiki .................. B65G 27/08
177/25.18
6,037,549 A    3/2000 Weck

FOREIGN PATENT DOCUMENTS

| | | |
|---|---|---|
| JP | H01-147320 U | 10/1989 |
| JP | H06-312822 A | 11/1994 |
| JP | H07-285637 A | 10/1995 |
| JP | 2001-253526 A | 9/2001 |
| JP | 2005-119819 A | 5/2005 |
| JP | 2010-038845 A | 2/2010 |
| WO | 97/42472 A1 | 11/1997 |

OTHER PUBLICATIONS

Notification of Transmittal of Translation of the International Preliminary Report on Patentability and Translation of the Written Opinion of the International Searching Authority issued in PCT/JP2015/076806; dated Mar. 30, 2017.
Southco; "37 Spannverschlüsse Für Anwendungen hoher Beanspruchung", http://www.southco.com; Jul. 2, 2010; XP055407622; Retrieved from the Internet; URL:http://www.southco.com/static/Literature/37.de.pdf.
The extended European search report issued by the European Patent Office dated Sep. 25, 2017, which corresponds to European Patent Application No. 15842855.7-1731 and is related to U.S. Appl. No. 15/510,101.

* cited by examiner

VIBRATORY CONVEYING APPARATUS COMPRISING TROUGH ATTACHMENT/DETACHMENT MECHANISM, AND COMBINATION WEIGHING APPARATUS

TECHNICAL FIELD

The present invention relates to a vibratory conveying apparatus comprising a trough attachment/detachment mechanism.

BACKGROUND ART

In a combination weighing apparatus, objects to be conveyed on a trough are conveyed by causing the trough to vibrate. The conveyed objects are aggregates of small pieces, such as potato chips or the like, or granular materials. Such a vibratory conveying apparatus is installed in a combination weighing machine set up in a food factory or the like.

Patent Literature 1 (Japanese Laid-open Patent Publication No. 7-285637) discloses a conventional vibratory conveying apparatus. This vibratory conveying apparatus has a trough, a vibrator, and a clamp ring for securing the trough and the vibrator to each other. The vibratory conveying apparatus, which handles food, must be cleaned periodically; therefore, the trough and the vibrator are designed so that they can be attached to and detached from each other. Specifically, the trough and the vibrator both have flat disc-shaped members, and the clamp ring secures the two together in a superposed state. The clamp ring secures the two disc-shaped members by clamping the entire peripheries thereof, and pressing these members toward each other by means of its tapered structure.

SUMMARY OF THE INVENTION

Technical Problem

In the process of manufacturing an apparatus, there will generally be some degree of nonuniformity among the shapes of the components. With the disc-shaped members, there could be variation in the flatness, the circularity of the circumferences, etc. When two disc-shaped members are clamped, this variation causes the clamping force to be unequal in different parts of the peripheries. Therefore, when the trough is attached to the vibrator, there will be positional misalignment, rotation, tilting and poor adhesion between the two disc-shaped members, and the conveyance objects will consequently be improperly conveyed.

An object of the present invention is to improve the precision applied in attaching and arranging the trough, and to properly convey the conveyance objects.

Solution to Problem

A vibratory conveying apparatus according to a first aspect of the present invention comprises a trough, a vibrator, and an attachment/detachment mechanism. The trough conveys articles from an upstream side to a downstream side. The vibrator vibrates the trough. The attachment/detachment mechanism attaches and detaches the trough and the vibrator. The attachment/detachment mechanism has a trough-side attachment/detachment member, a vibrator-side attachment/detachment member, and a lever. The trough-side attachment/detachment member is secured to the trough. The trough-side attachment/detachment member has a trough-side upstream engaging part disposed on the upstream side and a trough-side downstream engaging part disposed on the downstream side. The vibrator-side attachment/detachment member is secured to the vibrator. The vibrator-side attachment/detachment member has a vibrator-side upstream engaging part disposed on the upstream side and a vibrator-side downstream engaging part disposed on the downstream side. The lever is configured to be moved up and down to switch between a fixed state and a separated state. In the fixed state, the trough-side attachment/detachment member and the vibrator-side attachment/detachment member are fixed to each other. In the separated state, the trough-side attachment/detachment member and the vibrator-side attachment/detachment member are separated from each other. The trough-side upstream engaging part and the vibrator-side upstream engaging part engage together to configure an upstream attachment/detachment engaging part. The trough-side downstream engaging part and the vibrator-side downstream engaging part engage together to configure a downstream attachment/detachment engaging part.

According to the aspect described above, the trough-side attachment/detachment member and the vibrator-side attachment/detachment member are secured in two locations: the upstream attachment/detachment engaging part and the downstream attachment/detachment engaging part. Therefore, placement accuracy in the attaching of the trough is improved, and the conveyed objects are conveyed properly.

A vibratory conveying apparatus according to a second aspect of the present invention is the vibratory conveying apparatus according to the first aspect, further comprising a pulling member. The pulling member extends in a direction joining the upstream attachment/detachment engaging part and the downstream attachment/detachment engaging part, and the pulling member is linked to the lever.

According to the aspect described above, in the fixed state, the trough-side attachment/detachment member and the vibrator-side attachment/detachment member exert pressure on each other due to the pulling force exerted on the pulling member by the lever. As a result, rotation and/or tilting of the trough is further suppressed.

A vibratory conveying apparatus according to a third aspect of the present invention is the vibratory conveying apparatus according to the first or second aspect, wherein of the trough-side attachment/detachment member and the vibrator-side attachment/detachment member, one is a recessed-surface member having a recessed surface. Between the trough-side attachment/detachment member and the vibrator-side attachment/detachment member, the other has a sliding part that slides on the recessed surface during attaching and detaching. The sliding part is one of the trough-side upstream engaging part, the vibrator-side upstream engaging part, the trough-side downstream engaging part, and the vibrator-side downstream engaging part.

According to the aspect described above, a user can easily attach the trough to the vibrator by utilizing the recessed surface as a guide for sliding the sliding part.

A vibratory conveying apparatus according to a fourth aspect of the present invention is the vibratory conveying apparatus according to the third aspect, wherein the recessed-surface member has an accommodating part for accommodating the sliding part.

According to the aspect described above, the user can easily engage the trough-side attachment/detachment member and the vibrator-side attachment/detachment member together without accurately perceiving the state of the attachment/detachment mechanism by sight.

A vibratory conveying apparatus according to a fifth aspect of the present invention is the vibratory conveying apparatus according to any of the first through fourth aspects, wherein the lever is configured to be moved down to switch the separated state to the fixed state.

According to the aspect described above, when the user attaches the trough to the vibrator, the user can utilize their own body weight to move the lever down. As a result, attaching the trough is easier for the user.

A vibratory conveying apparatus according to a sixth aspect of the present invention is the vibratory conveying apparatus according to any of the first through fifth aspects, wherein the lever is disposed farther toward the downstream side than the vibrator.

According to the aspect described above, the lever is provided to a wide space located toward the downstream side in the conveying direction from the vibrator. As a result, the user's arm moves through a wide space when the user operates the lever, and the vibratory conveying apparatus is therefore easier for the user to operate.

A vibratory conveying apparatus according to a seventh aspect of the present invention is the vibratory conveying apparatus according to any of the first through sixth aspects, wherein of the trough-side attachment/detachment member and the vibrator-side attachment/detachment member, one has three protuberances and the other has a flat part.

According to the aspect described above, in the fixed state, the three protuberances support the flat part at three points. The orientation of the flat part is thereby stabilized because these three points definitively establish a flat surface.

A vibratory conveying apparatus according to an eighth aspect of the present invention is the vibratory conveying apparatus according to any of the first through seventh aspects, wherein the lever is formed with an eccentric cam.

According to the aspect described above, the lever is urged into the fixed state or the separated state depending on the orientation of the lever. As a result, the fixed state or the separated state is stable.

A vibratory conveying apparatus according to a ninth aspect of the present invention is the vibratory conveying apparatus according to the first aspect, further comprising an elastic member. The elastic member urges the lever either up or down, depending on the position of the lever.

According to the aspect described above, the force that brings about the fixed state is derived from the elastic member. Therefore, there is no need for an adjustment mechanism for adjusting the position of a movable member or the like.

A vibratory conveying apparatus according to a tenth aspect of the present invention is the vibratory conveying apparatus according to the ninth aspect, wherein the elastic member is a linear member having a bend.

According to the aspect described above, the configuration of the attachment/detachment mechanism is simple because the urging force of the lever is derived from a change in the angle of the bend in the elastic member.

A vibratory conveying apparatus according to an eleventh aspect of the present invention is the vibratory conveying apparatus according to the tenth aspect, wherein the lever is disposed on an article-conveying centerline. The bend has a first bend part and a second bend part. The first bend part and the second bend part are disposed to either side of the article-conveying centerline.

According to the aspect described above, the lever is subjected to urging force that is symmetric with respect to the lever. Therefore, a stable fixed state is brought about.

A vibratory conveying apparatus according to a twelfth aspect of the present invention is the vibratory conveying apparatus according to the tenth or eleventh aspect, wherein the bend is a straight line in a plan view and is bent in a side view.

According to the aspect described above, the elastic member does not jut out in a transverse direction in plan view. Therefore, the trough is easily attached and detached because contact and/or interference between the elastic member and other components is suppressed.

A vibratory conveying apparatus according to a thirteenth aspect of the present invention is the vibratory conveying apparatus according to any of the ninth through twelfth aspects, wherein the elastic member and the lever are attached to the trough-side attachment/detachment member.

According to the aspect described above, because the elastic member and the lever are removed together with the trough, the apparatus and/or the components are easily cleaned. Furthermore, instances of the elastic member and the lever getting mixed in as foreign objects among the conveyed articles are suppressed.

A vibratory conveying apparatus according to a fourteenth aspect of the present invention is the vibratory conveying apparatus according to any of the ninth through thirteenth aspects, wherein in the fixed state, the trough-side attachment/detachment member is pressed against the vibrator-side attachment/detachment member in the upstream attachment/detachment engaging part and the downstream attachment/detachment engaging part.

According to the aspect described above, in the fixed state, the trough-side attachment/detachment member and the vibrator-side attachment/detachment member exert pressure on each other in two locations: the upstream side and the downstream side. As a result, rotation and/or tilting of the trough is further suppressed.

A vibratory conveying apparatus according to a fifteenth aspect of the present invention is the vibratory conveying apparatus according to any of the ninth through fourteenth aspects, wherein of the trough-side attachment/detachment member and the vibrator-side attachment/detachment member, one is a recessed-surface member having a recessed surface. Between the trough-side attachment/detachment member and the vibrator-side attachment/detachment member, the other has a sliding part that slides on the recessed surface during attaching and detaching. The sliding part is one of the trough-side upstream engaging part, the vibrator-side upstream engaging part, the trough-side downstream engaging part, or the vibrator-side downstream engaging part.

According to the aspect described above, a user can easily attach the trough to the vibrator by utilizing the recessed surface as a guide for sliding the sliding part.

A vibratory conveying apparatus according to a sixteenth aspect of the present invention is the vibratory conveying apparatus according to the fifteenth aspect, wherein the recessed-surface member has a hole for accommodating the sliding part.

According to the aspect described above, the user can easily cause the trough-side attachment/detachment member and the vibrator-side attachment/detachment member to engage one another without accurately perceiving the state of the attachment/detachment mechanism by sight.

A vibratory conveying apparatus according to a seventeenth aspect of the present invention is the vibratory conveying apparatus according to any of the ninth through sixteenth aspects, wherein the lever is moved down to switch the separated state to the fixed state.

According to the aspect described above, when the user attaches the trough to the vibrator, the user can utilize their own body weight to move the lever down. As a result, attaching the trough is easier for the user.

A vibratory conveying apparatus according to an eighteenth aspect of the present invention is the vibratory conveying apparatus according to any of the ninth through seventeenth aspects, wherein between the trough-side attachment/detachment member and the vibrator-side attachment/detachment member, one has three protuberances. Between the trough-side attachment/detachment member and the vibrator-side attachment/detachment member, the other has a flat part.

According to the aspect described above, in the fixed state, the three protuberances support the flat part at three points. The orientation of the flat part is thereby stabilized because these three points definitively establish a flat surface.

A combination weighing apparatus according to a nineteenth aspect of the present invention comprises a plurality of vibratory conveying apparatuses. Each of the plurality of vibratory conveying apparatuses is the vibratory conveying apparatus according to any of the first through eighteenth aspects.

According to the aspect described above, there is provided a combination weighing apparatus in which the trough does not readily lose positional alignment relative to the vibrator.

Advantageous Effects of Invention

With the vibratory conveying apparatus or the combination weighing apparatus according to the present invention, the precision of attaching and arranging the trough is improved, and the conveyed objects are properly conveyed.

DESCRIPTION OF EMBODIMENTS

First Embodiment (1) Overall Configuration

Figure 1:
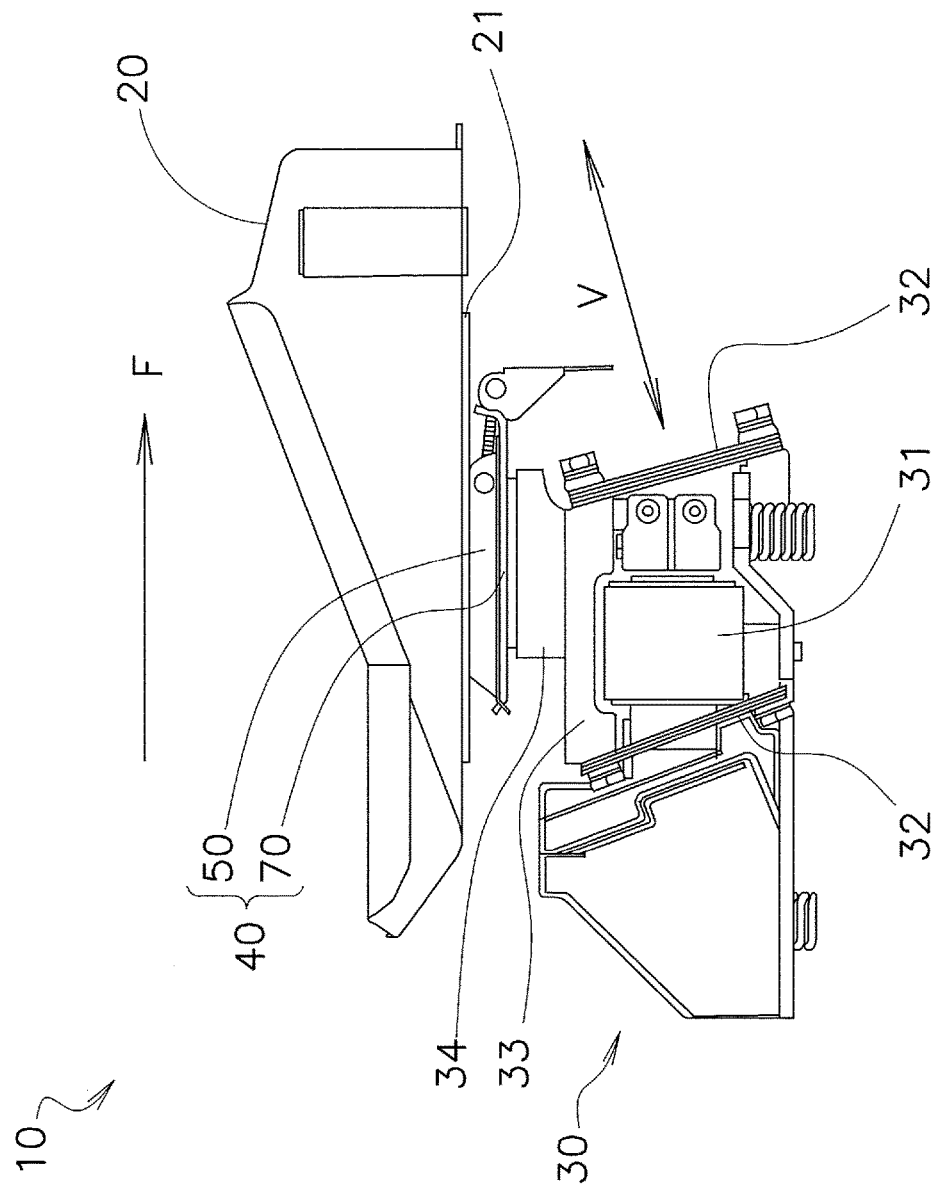
FIG. 1 is a side view of a vibratory conveying apparatus according to a first embodiment of the present invention.

FIG. 1 is a side view showing an external view of a vibratory conveying apparatus 10 according to a first embodiment of the present invention. The vibratory conveying apparatus 10 has a trough 20, a vibrator 30, and an attachment/detachment mechanism 40. The trough 20 and the vibrator 30 are secured to each other via the attachment/detachment mechanism 40.

(2) Detailed Configuration

The elements of the vibratory conveying apparatus 10 are described below.

(2-1) Trough 20

The trough 20 shown in FIG. 1 is a conveying path through which articles placed on the trough move in a conveying direction F. A trough bottom plate 21 is provided on the bottom surface of the trough 20.

Figure 2:
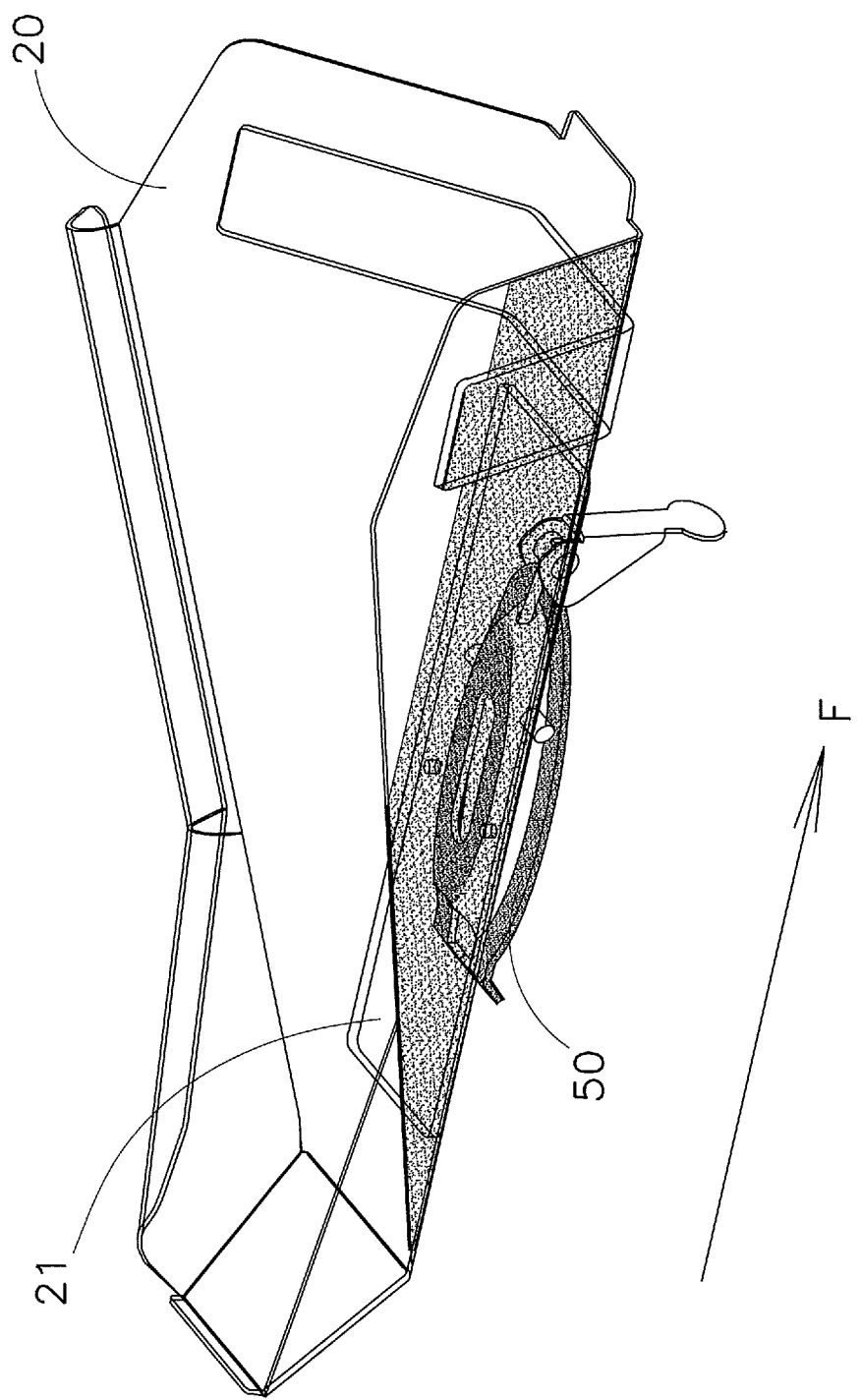
FIG. 2 is a perspective view of the trough of the vibratory conveying apparatus according to the first embodiment of the present invention.

The trough 20 is U-shaped when viewed from the conveying direction F, as shown in FIG. 2.

(2-2) Vibrator 30

The vibrator 30 shown in FIG. 1 has an electromagnet 31. Through a plate spring 32, the electromagnet 31 causes a vibrating part 33 to vibrate so as to move back and forth along a vibrational direction V. A support member 34 is secured to the vibrating part 33.

(2-3) Attachment/Detachment Mechanism 40

The attachment/detachment mechanism 40 shown in FIG. 1 has a trough-side attachment/detachment member 50 and a vibrator-side attachment/detachment member 70.

(2-3-1) Trough-Side Attachment/Detachment Member 50

The trough-side attachment/detachment member 50 is secured to the trough bottom plate 21 by screws, bolts, rivets, welding, or other means, as shown in FIG. 2.

Figure 3:
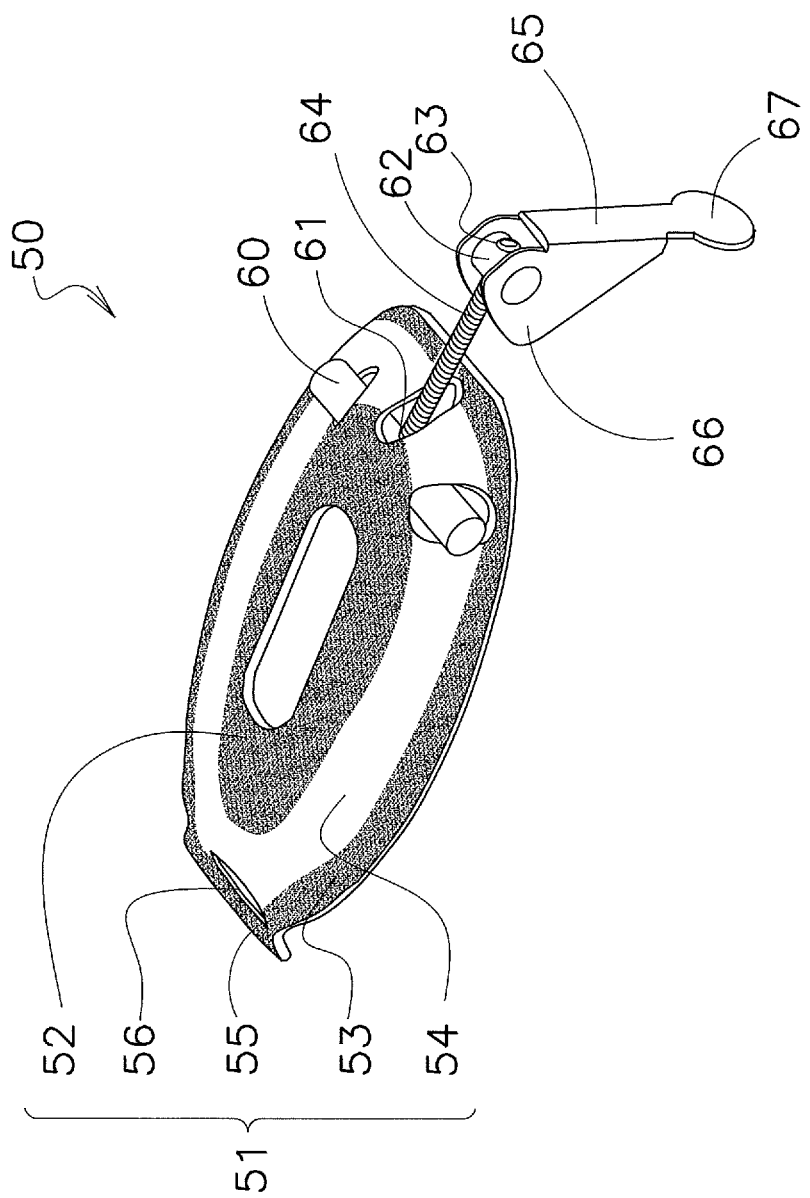
FIG. 3 is a perspective view of the trough-side attachment/detachment member of the vibratory conveying apparatus according to the first embodiment of the present invention.

FIG. 3 is a perspective view of the trough-side attachment/detachment member 50. The trough-side attachment/detachment member 50 has a main body part 51 having an elliptical shape in a plan view, as shown in FIG. 3. The main body part 51 has a first flat part 52 in a high position, a second flat part 53 in a low position, an inclined part 54 joining the first flat part and the second flat part, and a protruding part 55 in which an accommodating part 56 is formed. The trough-side attachment/detachment member 50 further has a first rod member 60 in which a screw hole 61 is formed, a second rod member 62 in which a screw hole 63 is formed, a screw 64 threaded into the screw hole 61 and the screw hole 63, and a lever 65 turnably attached to the second rod member 62. An eccentric cam 66 and a tab 67 are formed on the lever 65.

The screw 64 is an adjustment mechanism for adjusting the distance between the first rod member 60 and the second rod member 62, and the screw can be rotated to vary the magnitude of the force with which the trough-side attachment/detachment member 50 and the vibrator-side attachment/detachment member 70 push against each other in the fixed state.

(2-3-2) Vibrator-Side Attachment/Detachment Member 70

Figure 4:
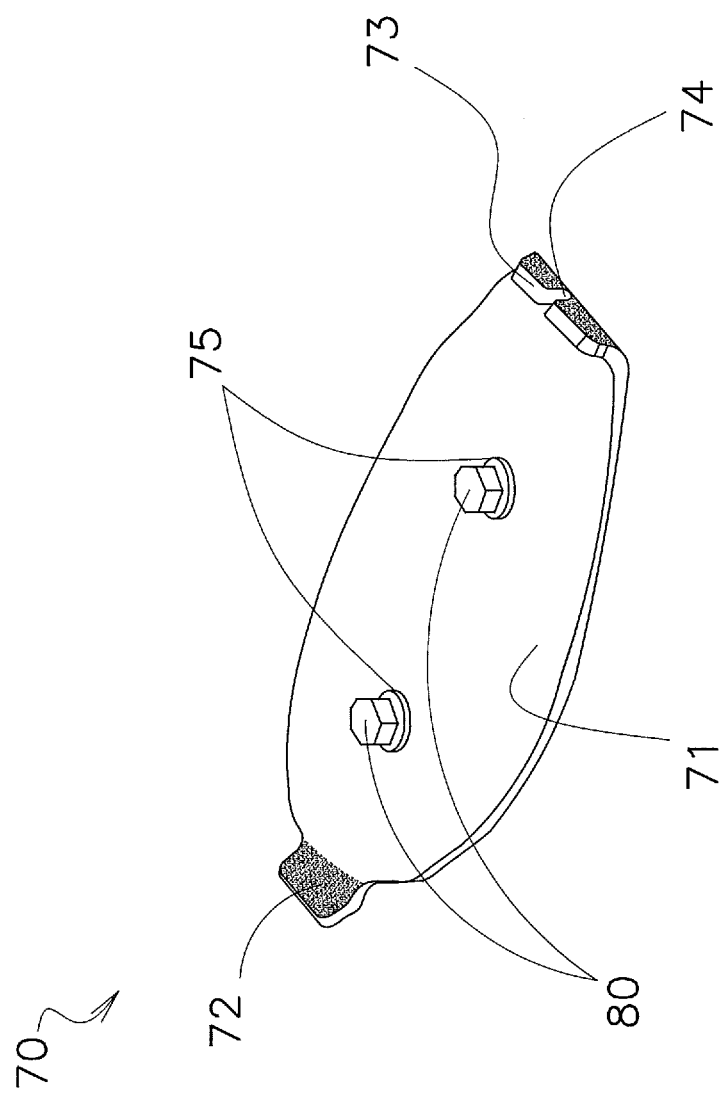
FIG. 4 is a perspective view of the vibrator-side attachment/detachment member of the vibratory conveying apparatus according to the first embodiment of the present invention.

FIG. 4 is a perspective view of the vibrator-side attachment/detachment member 70. The vibrator-side attachment/detachment member 70 is provided with a flat plate part 71, a protruding part 72, a bent part 73 in which a recess part 74 is formed, and through-holes 75, as shown in FIG. 4. The through-holes 75 are provided to allow passage therethrough of bolts 80 for securing the vibrator-side attachment/detachment member 70 to the support member 34 of the vibrator 30.

(3) Attaching/Detaching Action

Figure 5:
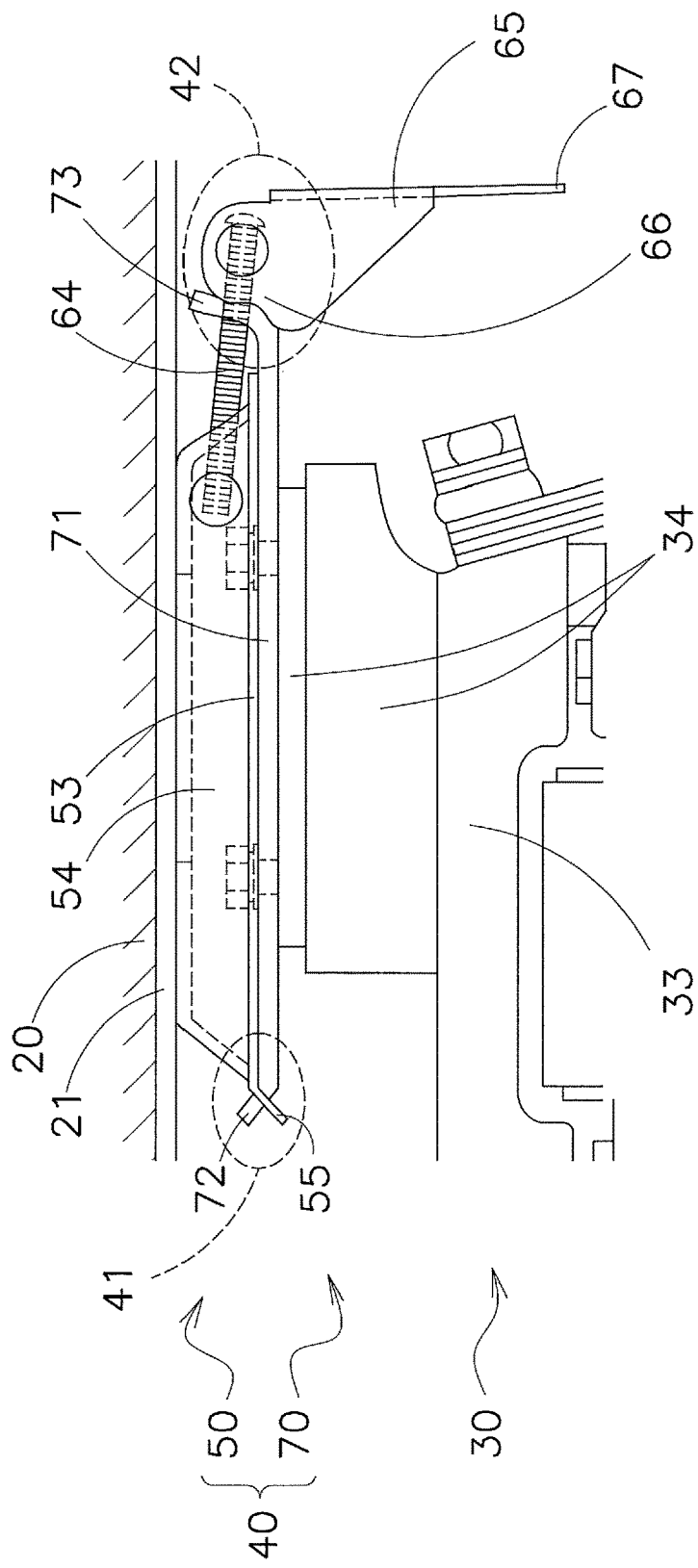
FIG. 5 is a side view of the trough attachment/detachment mechanism of the vibratory conveying apparatus according to the first embodiment of the present invention.
Figure 6:
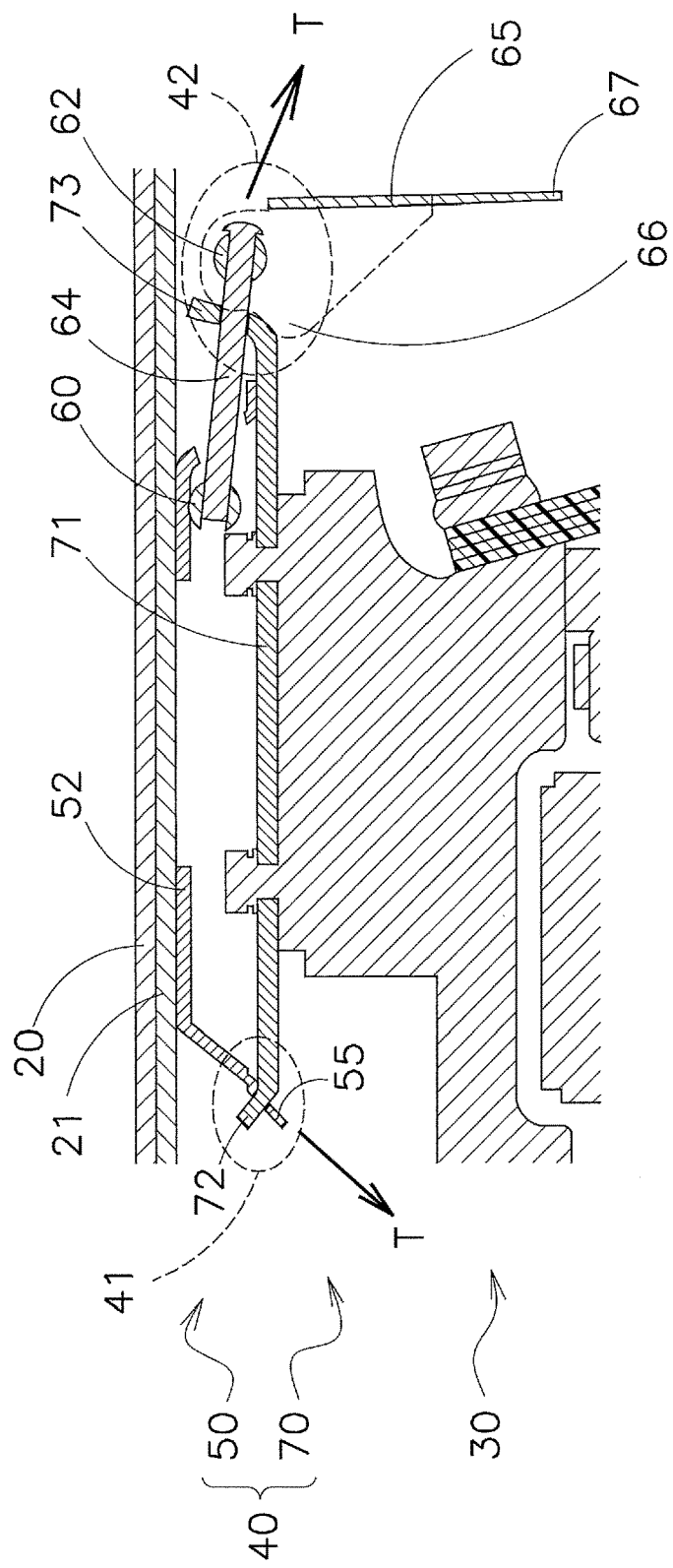
FIG. 6 is a cross-sectional view of the trough attachment/detachment mechanism of the vibratory conveying apparatus according to the first embodiment of the present invention.

FIG. 5 is a side view of the attachment/detachment mechanism 40 in a state where the trough 20 and the vibrator 30 fixed to each other. FIG. 6 is a cross-sectional view of the attachment/detachment mechanism 40. These drawings are used as a reference to describe the attaching/detaching action below.

The first flat part 52 (see FIG. 3) of the trough-side attachment/detachment member 50 is secured to the trough bottom plate 21 of the trough 20. The vibrator-side attachment/detachment member 70 is secured to the support member 34 of the vibrator 30. In this state, the user places the trough-side attachment/detachment member 50 on top of the vibrator-side attachment/detachment member 70. When this action is performed, the user inserts the protruding part 72 of the vibrator-side attachment/detachment member 70 into the accommodating part 56 of the protruding part 55 of the trough-side attachment/detachment member 50. As long as the accommodating part 56 is able to accommodate the protruding part 55, the accommodating part may be in the shape of a U-shaped hole, a hole in a shape of something other than U, a U-shaped groove, a groove having some other shape, a recess, etc. The engaging part comprising the protruding part 72 of the vibrator-side attachment/detachment member 70, and the protruding part 55 and accommodating part 56 of the trough-side attachment/detachment member 50, is referred to below as the "upstream attachment/detachment engaging part 41." The user also places the screw 64 of the trough-side attachment/detachment member 50 on the recess part 74 of the vibrator-side attachment/detachment member 70. The engaging part comprising the screw 64, the eccentric cam 66, and other parts of the trough-side attachment/detachment member 50, as well as the bent part 73 and the recess part 74 of the vibrator-side attachment/detachment member 70, is referred to below as the "downstream attachment/detachment engaging part 42."

Next, the user proceeds to push the tab 67 of the lever 65 of the trough-side attachment/detachment member 50 downward. During the start of this action, the portion of the eccentric cam 66 that is in contact with the bent part 73 increases in diameter; therefore, the contact pressure between the eccentric cam 66 and the bent part 73 gradually increases. In this stage, in the case that the user stops pushing the tab 67 downward, restoring force caused by the contact pressure acts to return the lever 65 to the original position, and the trough-side attachment/detachment member 50 and vibrator-side attachment/detachment member 70 return to the separated state. In the case that the user continue to push on the tab 67 in this stage, by contrast, the diameter of the portion of the eccentric cam 66 that is in contact with the bent part 73 decreases again after having reached a maximum value; therefore, the contact pressure between the eccentric cam 66 and the bent part 73 proceeds to decrease, and the lever 65 is easily lowered. Thus, the trough-side attachment/detachment member 50 and the vibrator-side attachment/detachment member 70 reach the fixed state and stabilize. In the fixed state, tensile force T shown in FIG. 6 is exerted on the trough-side attachment/detachment member 50. The trough-side attachment/detachment member 50 is thereby pushed toward the vibrator-side attachment/detachment member 70 at the upstream attachment/detachment engaging part 41 and the downstream attachment/detachment engaging part 42.

(4) Characteristics (4-1)

The trough-side attachment/detachment member 50 and the vibrator-side attachment/detachment member 70 are secured at two locations: the upstream attachment/detachment engaging part 41 and the downstream attachment/detachment engaging part 42. In this case, even when the trough-side attachment/detachment member 50 and the vibrator-side attachment/detachment member 70 have some degree of unintended unevenness, there would not likely be unsteadiness between the trough-side attachment/detachment member 50 and the vibrator-side attachment/detachment member 70. As a result, positional misalignment, i.e., rotation and/or tilting of the trough 20 is suppressed. Therefore, precision of arrangement when attaching the trough 20 is improved, and conveyance objects are conveyed properly.

Additionally, because the lever 65 is moved up and down, the work of attaching the trough 20 and/or the work of removing the trough is facilitated regardless of where the user is positioned in relation to the lever 65.

(4-2)

In the fixed state, the trough-side attachment/detachment member 50 and the vibrator-side attachment/detachment member 70 are pushed against each other by the tensile force T exerted on the trough-side attachment/detachment member 50. As a result, rotation and/or tilting of the trough 20 is further suppressed.

(4-3)

The user can utilize the recessed surface on the back surfaces of the first flat part 52 and inclined part 54 of the trough-side attachment/detachment member 50 as a guide for sliding the protruding part 72 of the vibrator-side attachment/detachment member 70. As a result, the user can easily attach the trough to the vibrator.

Additionally, whereas the trough-side attachment/detachment member 50 has a recessed-surface structure, the vibrator-side attachment/detachment member 70 has a substantially flat-plate structure. Therefore, the trough-side attachment/detachment member 50, which has a complex recessed-surface structure that is difficult to clean, can be removed and moved, and the vibrator-side attachment/detachment member 70, which cannot be moved, has a simple flat-plate structure that is easily cleaned. As a result, the vibratory conveying apparatus 10 can be easily cleaned.

(4-4)

The protruding part 72 of the vibrator-side attachment/detachment member 70 fits into the accommodating part 56 formed at the protruding part 55 of the trough-side attachment/detachment member 50. As a result, the user can easily cause the trough-side attachment/detachment member 50 and the vibrator-side attachment/detachment member 70 to engage one another without accurately perceiving the state of the attachment/detachment mechanism 40 by sight.

(4-5)

When the lever 65 is moved downward, the attachment/detachment mechanism 40 assumes the fixed state. As a result, when the user attaches the trough 20 to the vibrator 30, the user can utilize their own body weight to move the tab 67 down, and attaching the trough is therefore easier.

(4-6)

The lever 65 is provided to a wide space located toward the downstream side in the conveying direction F from the vibrator 30. As a result, the user's arm is enabled to move in a wide space when the user operates the lever 65, and the vibratory conveying apparatus 10 is therefore easier for the user to manipulate.

(4-7)

The lever 65 is formed with the eccentric cam 66. Therefore, the lever 65 is urged into the fixed state or the separated state, depending on the orientation of the lever. As a result, the fixed state or the separated state is stable.

(5) Modifications (5-1) Modification 1A

Figure 7:
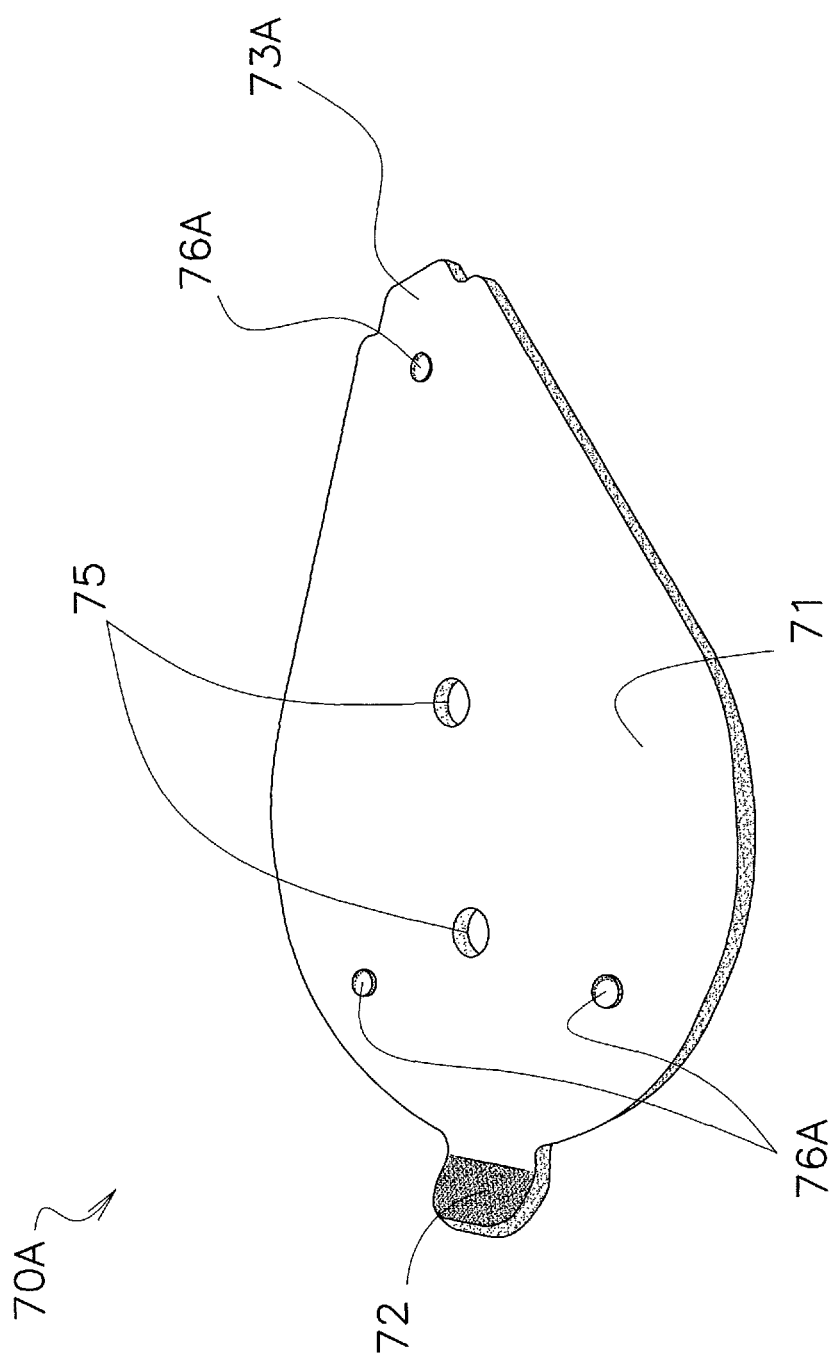
FIG. 7 is a perspective view of the vibrator-side attachment/detachment member according to a first modification 1A of the vibratory conveying apparatus according to the first embodiment of the present invention.

FIG. 7 is a perspective view showing a vibrator-side attachment/detachment member 70A of a vibratory conveying apparatus 10 according to a first modification 1A of the above-described first embodiment of the present invention. Unlike the vibrator-side attachment/detachment member 70 (see FIG. 4) according to the embodiment described above, the vibrator-side attachment/detachment member 70A according to modification A has an extended part 73A instead of the bent part 73. Furthermore, the vibrator-side attachment/detachment member 70A has three protuberances 76A. The three protuberances 76A are provided to positions where the protuberances will be in contact with the second flat part 53 of the trough-side attachment/detachment member 50 in the fixed state.

In the attaching/detaching action, the extended part 73A fulfills the same role as the bent part 73 (see FIG. 4) according to the embodiment described above.

With this configuration, in the fixed state, the three protuberances 76A of the vibrator-side attachment/detachment member 70A support the second flat part 53 of the trough-side attachment/detachment member 50 at three points. The orientation of the second flat part 53 is thereby stable because these three points definitively establish a flat plane.

(5-2) Modification 1B

Figure 8:
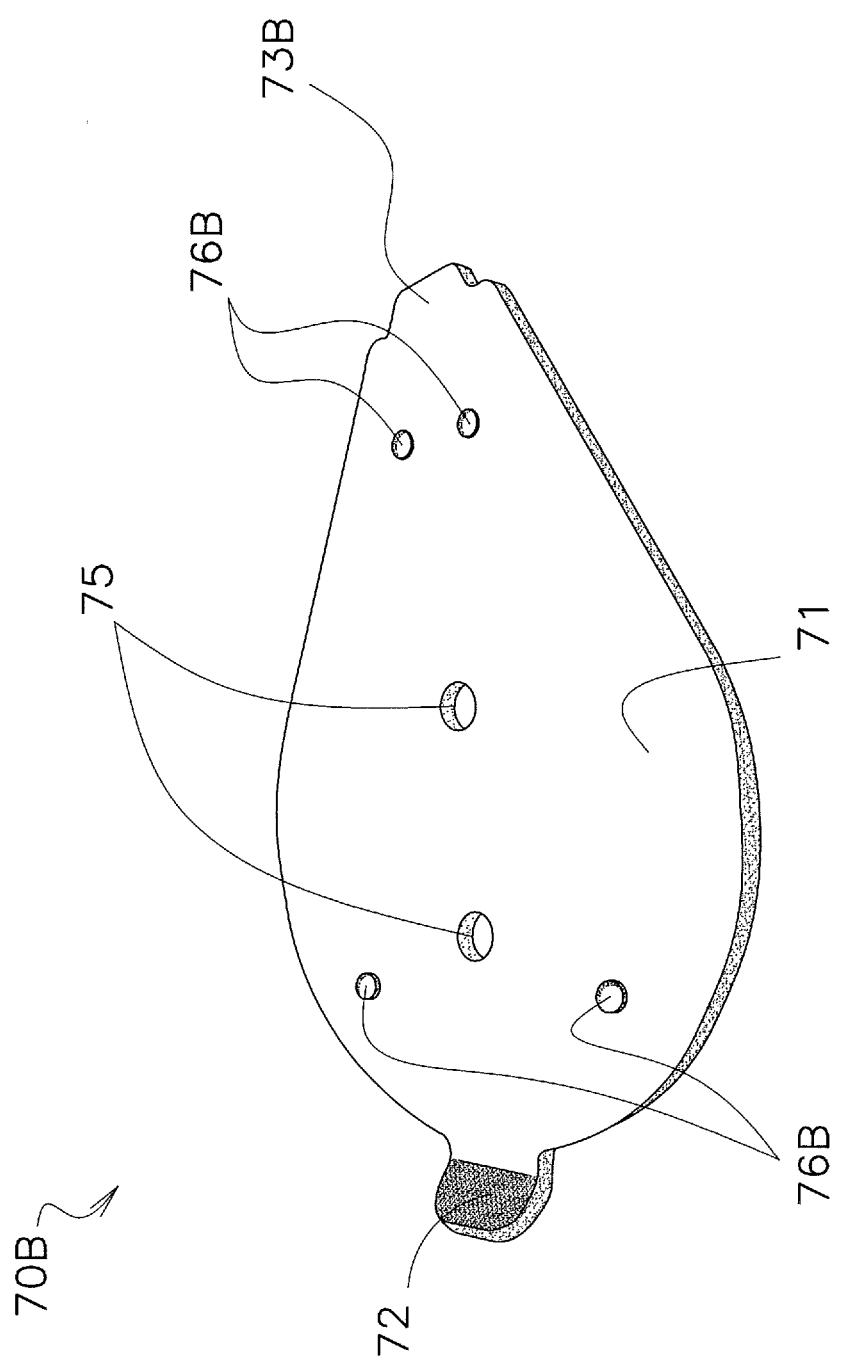
FIG. 8 is a perspective view of the vibrator-side attachment/detachment member according to a second modification 1B of the vibratory conveying apparatus according to the first embodiment of the present invention.

FIG. 8 is a perspective view showing a vibrator-side attachment/detachment member 70B of a vibratory conveying apparatus 10 according to a modification 1B of the above-described first embodiment of the present invention. Unlike the vibrator-side attachment/detachment member 70 (see FIG. 4) according to the embodiment described above, the vibrator-side attachment/detachment member 70A according to modification B has an extended part 73B instead of the bent part 73. Furthermore, the vibrator-side attachment/detachment member 70A has four protuberances 76B. The four protuberances 76B are provided to positions where the protuberances will be in contact with the second flat part 53 of the trough-side attachment/detachment member 50 in the fixed state. Two of these four protuberances 76B are disposed on the upstream side, and two are disposed on the downstream side.

In the attaching/detaching action, the extended part 73B fulfills the same role as the bent part 73 (see FIG. 4) according to the embodiment described above.

With this configuration, the upstream side of the attachment/detachment mechanism 40 is secured at three points: the upstream attachment/detachment engaging part 41 and two of the protuberances 76B. The downstream side of the attachment/detachment mechanism 40 is secured at three points: the downstream attachment/detachment engaging part 42 and two of the protuberances 76B. Therefore, the trough-side attachment/detachment member 50 and the vibrator-side attachment/detachment member 70 are firmly secured.

Second Embodiment (1) Overall Configuration

Figure 11:
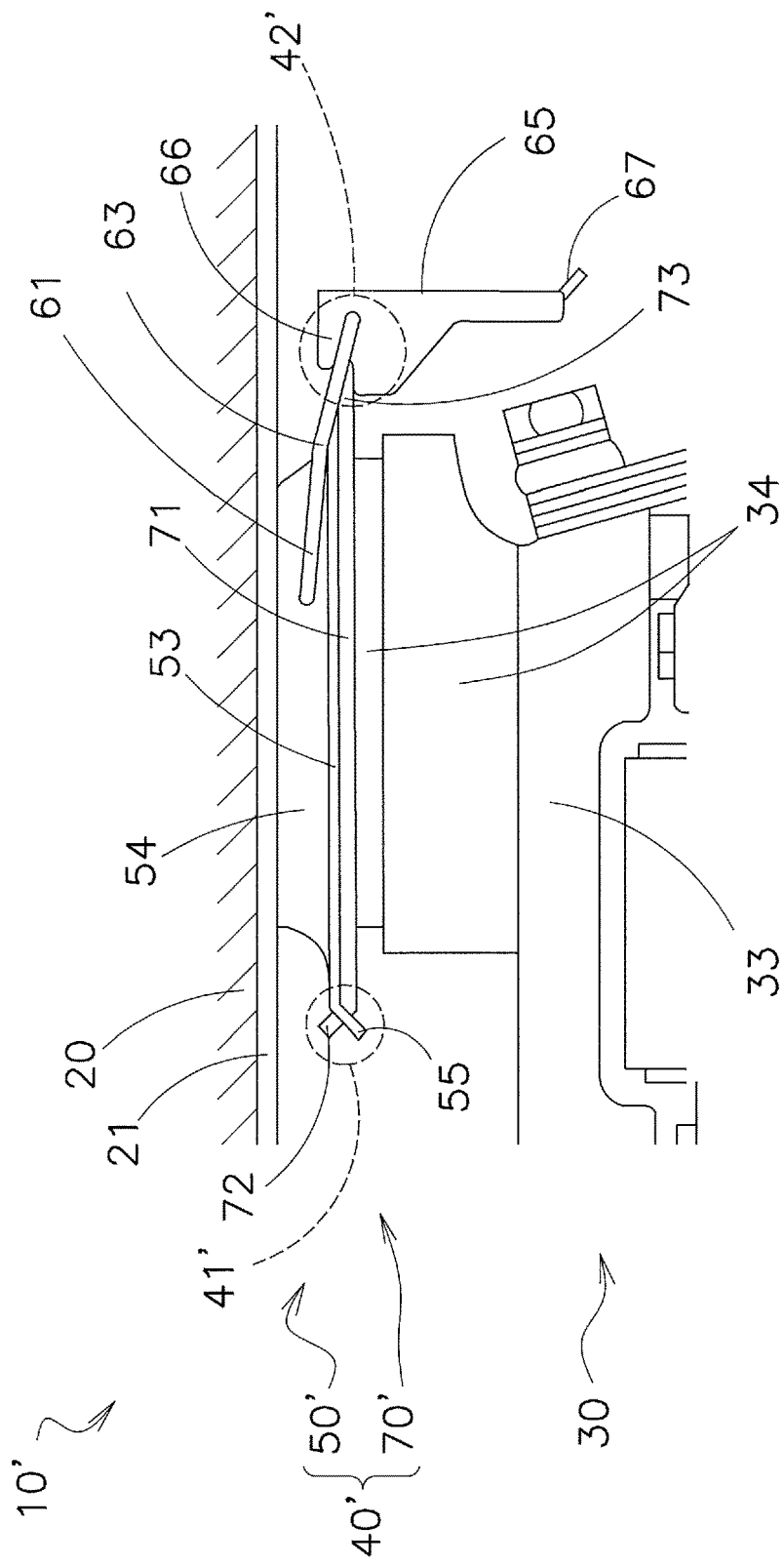
FIG. 11 is a side view of the trough attachment/detachment mechanism of the vibratory conveying apparatus according to the second embodiment of the present invention.

In a vibratory conveying apparatus 10' according to a second embodiment of the present invention, shown in FIG. 11, the structure of an attachment/detachment mechanism 40' differs from that of the attachment/detachment mechanism 40 employed in the vibratory conveying apparatus 10 according to the first embodiment. The vibratory conveying apparatus 10' has a trough 20 and a vibrator 30 similar to those of the first embodiment.

(2) Attachment/Detachment Mechanism 40'

The attachment/detachment mechanism 40' has a trough-side attachment/detachment member 50' and a vibrator-side attachment/detachment member 70', as shown in FIG. 11.

(2-1) Trough-Side Attachment/Detachment Member 50'

The trough-side attachment/detachment member 50' is secured to the trough bottom plate 21 by screws, bolts, rivets, welding, or other means.

Figure 9:
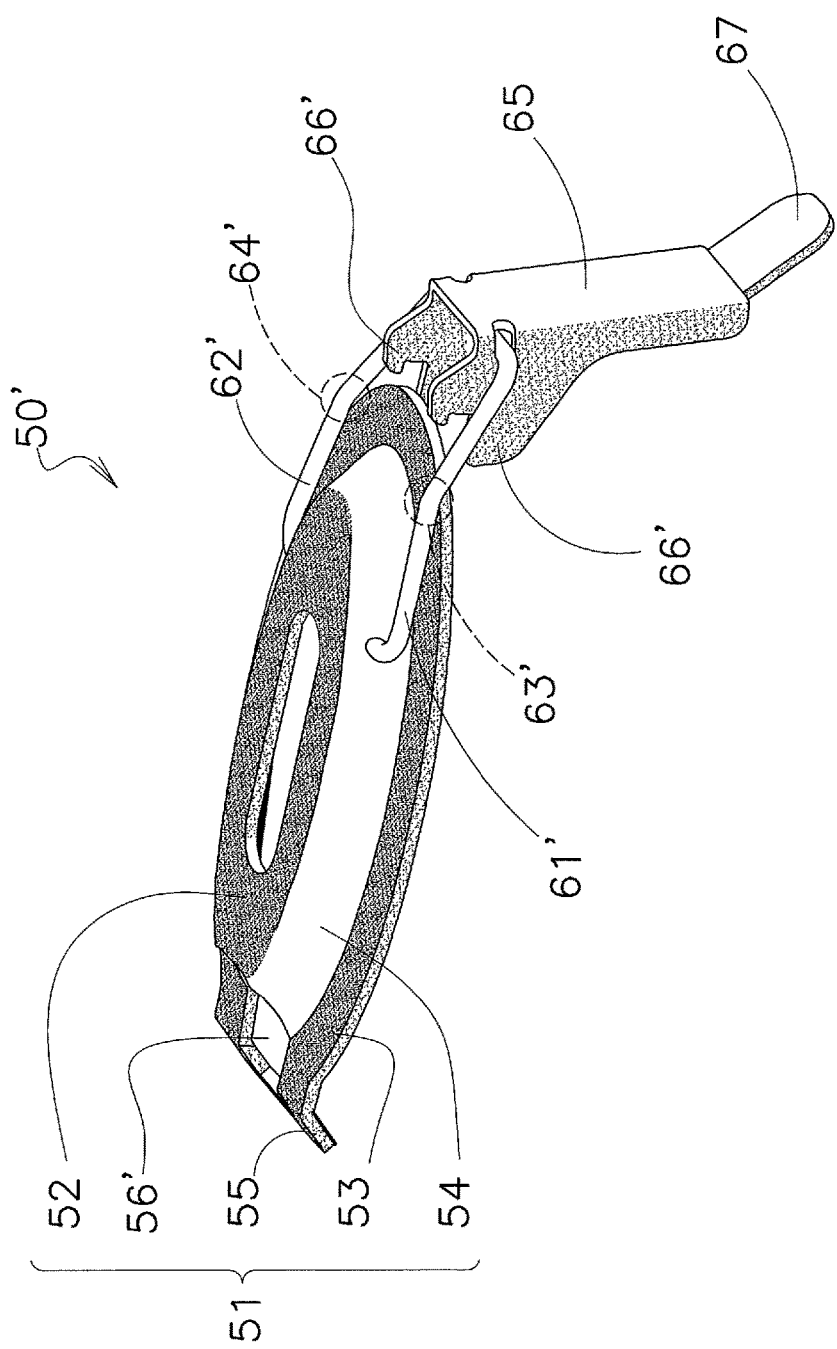
FIG. 9 is a perspective view of the trough-side attachment/detachment member of the vibratory conveying apparatus according to the second embodiment of the present invention.

FIG. 9 is a perspective view of the trough-side attachment/detachment member 50'. The trough-side attachment/detachment member 50' has a main body part 51 having an ellipsoidal shape in plan view, as shown in FIG. 9. The main body part 51 has a first flat part 52 in a high position, a second flat part 53 in a low position, an inclined part 54 joining the first flat part and the second flat part, and a protruding part 55 where a hole 56' is formed. The trough-side attachment/detachment member 50' further has a lever 65 on which a hook 66' and a tab 67 are formed.

The main body part 51 and the lever 65 are turnably linked by a first spring 61' and a second spring 62'. The first spring 61' and the second spring 62' are provided to either side of the lever 65. The first spring 61' and the second spring 62' may be separate members, or may be formed from a single wire.

The first spring 61' and the second spring 62' respectively have a first bent part 63' and a second bent part 64'. The first bent part 63' and the second bent part 64' appear to be straight lines in plan view, and appear to bend in side view. Various forms can be adopted for the shape of the first bent part 63' and the second bent part 64', from a slight curve having a large radius of curvature, to a bend having a small radius of curvature. The first spring 61' and the second spring 62' exert force on other members due to the first bent part 63' and the second bent part 64' undergoing elastic deformation.

(2-2) Vibrator-Side Attachment/Detachment Member 70'

Figure 10:
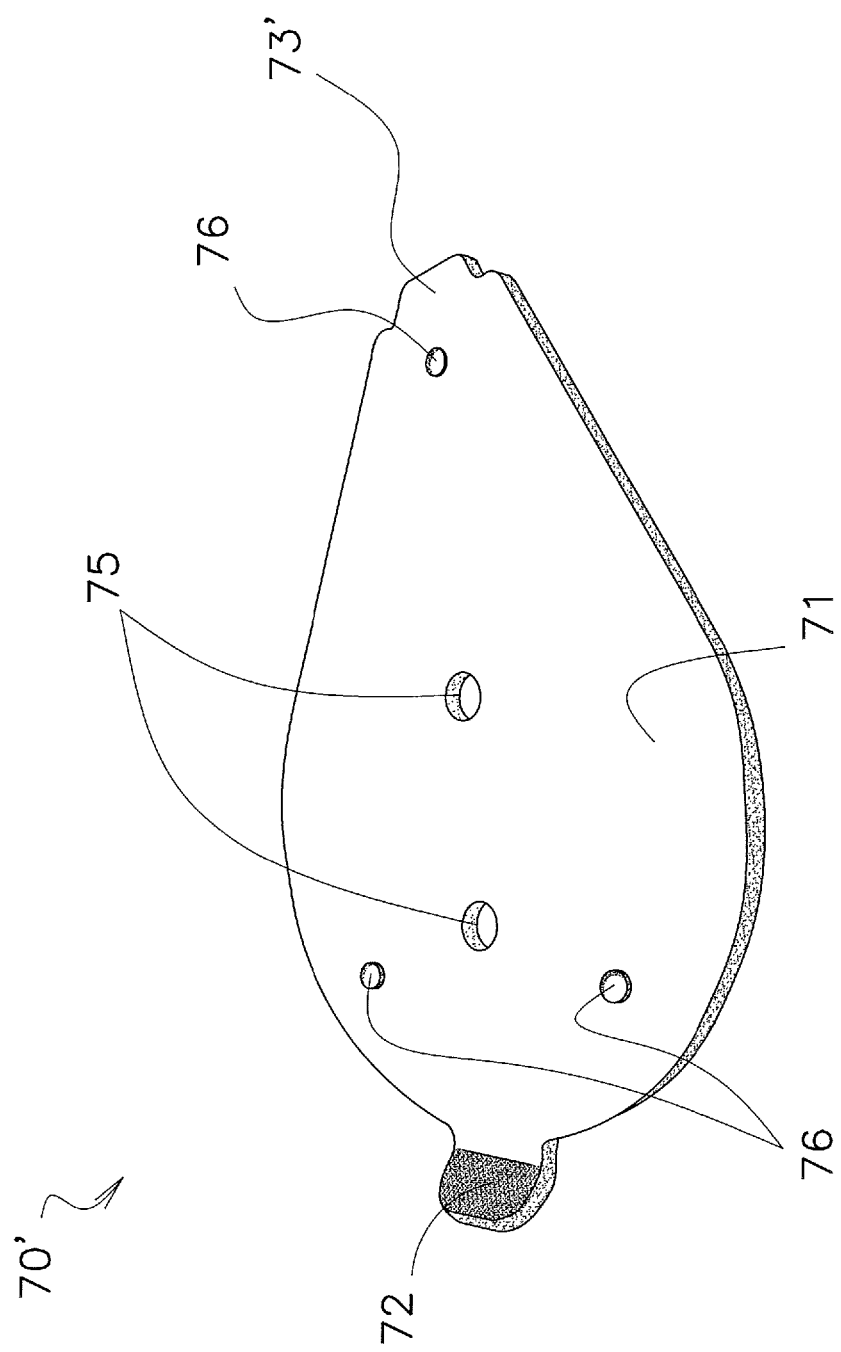
FIG. 10 is a perspective view of the vibrator-side attachment/detachment member of the vibratory conveying apparatus according to the second embodiment of the present invention.

FIG. 10 is a perspective view of the vibrator-side attachment/detachment member 70'. The vibrator-side attachment/detachment member 70' is provided with a flat plate part 71, a protruding part 72, an extending part 73', and through-holes 75, as shown in FIG. 10. The through-holes 75 are provided to allow passage therethrough of bolts for securing the vibrator-side attachment/detachment member 70' to the support member 34 of the vibrator 30. Furthermore, the vibrator-side attachment/detachment member 70' has three protuberances 76'. The three protuberances 76' are provided to positions where the protuberances will be in contact with the second flat part 53 of the trough-side attachment/detachment member 50' in the fixed state.

(3) Attaching/Detaching Action

Figure 12:
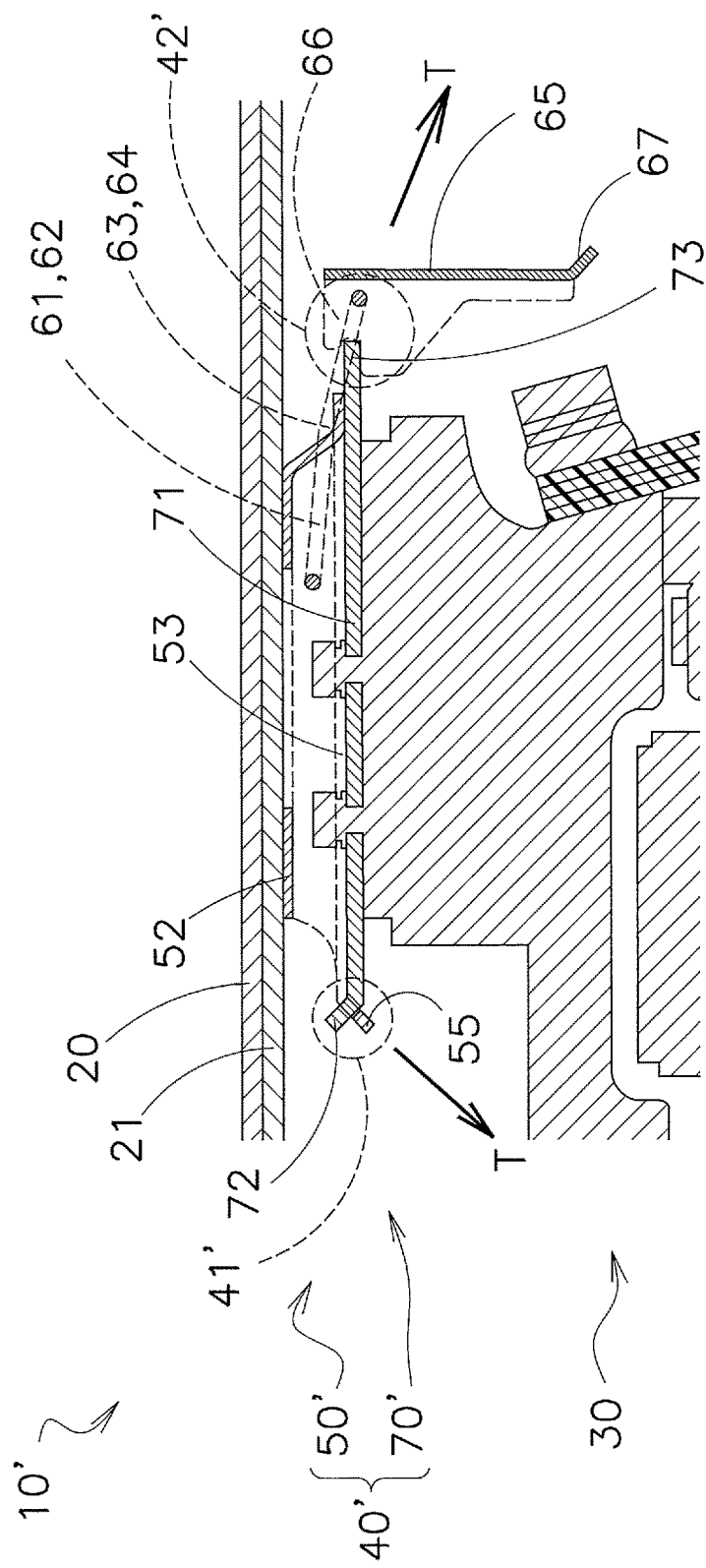
FIG. 12 is a cross-sectional view of the trough attachment/detachment mechanism of the vibratory conveying apparatus according to the second embodiment of the present invention.

FIG. 11 is a side view of the attachment/detachment mechanism 40' in a state where the trough 20 and the vibrator 30 fixed to each other. FIG. 12 is a cross-sectional view of the attachment/detachment mechanism 40'. These drawings are used as a reference to describe the attaching/detaching action below.

The first flat part 52 (see FIG. 9) of the trough-side attachment/detachment member 50' is secured to the trough bottom plate 21 of the trough 20. The vibrator-side attachment/detachment member 70' is secured to the support member 34 of the vibrator 30. In this state, the user places the trough-side attachment/detachment member 50' on top of the vibrator-side attachment/detachment member 70'. At this time, the user inserts the protruding part 72 of the vibrator-side attachment/detachment member 70' into the hole 56' of the protruding part 55 of the trough-side attachment/detachment member 50'. As long as the hole 56' is able to engage with the protruding part 72, the shape of the hole 56' may be, e.g., the shape of a letter U. Alternatively, the hole 56' may also be a U-shaped groove, a groove having some other shape, a recess, etc. The engaging part comprising the protruding part 72 of the vibrator-side attachment/detachment member 70', and the protruding part 55 and hole 56' of the trough-side attachment/detachment member 50', is referred to below as the "upstream attachment/detachment engaging part 41'." The user also causes the hook 66' of the lever 65 and the extending part 73' of the vibrator-side attachment/detachment member 70' to mesh together. The engaging part comprising the hook 66' of the lever 65 and the extending part 73' of the vibrator-side attachment/detachment member 70' is referred to below as the "downstream attachment/detachment engaging part 42'."

Next, the user proceeds to push the tab 67 of the lever 65 of the trough-side attachment/detachment member 50' downward. During the start of this action, the first bent part 63' of the first spring 61' and the second bent part 64' of the second spring 62' elastically deform, and the restoring force increases. In this stage, in the case that the user stops pushing the tab 67 downward, the restoring force acts to return the lever 65 to the original position, and the trough-side attachment/detachment member 50' and the vibrator-side attachment/detachment member 70' return to the separated state. In the case that the user continue to push on the tab 67 in this stage, by contrast, the angle of the first bent part 63' and the second bent part 64' approach the original shape, and the lever 65 is easily lowered. Thus, the trough-side attachment/detachment member 50' and the vibrator-side attachment/detachment member 70' reach the fixed state and stabilize. In the fixed state, tensile force T shown in FIG. 12 is exerted on the trough-side attachment/detachment member 50'. In other words, the trough-side attachment/detachment member 50' is pushed toward the vibrator-side attachment/detachment member 70' at the upstream attachment/detachment engaging part 41' and the downstream attachment/detachment engaging part 42'.

(4) Characteristics (4-1)

A firm fixed state in which positional misalignment is unlikely to occur in the trough 20 is brought about by the urging force exerted by the first spring 61' and the second spring 62' on the lever 65. Additionally, because urging force is derived from the first spring 61' and the second spring 62', there is no need for an adjustment mechanism for adjusting positions or the like.

(4-2)

Because the urging force of the lever is derived from change of the bend angle and/or the shape of the first spring 61' and the second spring 62', the configuration of the attachment/detachment mechanism 40' is simple.

(4-3)

The first bent part 63' and the second bent part 64' are disposed on either side of the article-conveying centerline. As a result, the lever 65 is subjected to urging force that is symmetrical with respect to the lever 65, and a stable fixed state is therefore brought about.

(4-4)

The first bent part 63' and the second bent part 64' appear to be straight lines in plan view, and appear to bend in side view. As a result, the first spring 61' and the second spring 62' do not jut out in a transverse direction in plan view, and do not readily come into contact or interfere with other components. Therefore, the user can attach and detach the trough 20 easily.

(4-5)

The first spring 61', the second spring 62', and the lever 65 are attached to the trough-side attachment/detachment member 50'. Therefore, these members are removed together with the trough 20, and the apparatus and/or components are easily cleaned. Furthermore, because these members are linked to the trough 20, interfusion of these members as foreign objects among the conveyed articles are suppressed.

(4-6)

In the fixed state, the trough-side attachment/detachment member 50' and the vibrator-side attachment/detachment member 70' exert pressure on each other at two locations: the upstream attachment/detachment engaging part 41' and the downstream attachment/detachment engaging part 42'. As a result, rotation and/or tilting of the trough 20 is further suppressed.

(4-7)

The user can utilize the recessed surface on the back surfaces of the first flat part 52 and inclined part 54 of the trough-side attachment/detachment member 50' as a guide for sliding the protruding part 72 of the vibrator-side attachment/detachment member 70'. As a result, the user can easily attach the trough 20 to the vibrator 30.

(4-8)

The protruding part 72 of the vibrator-side attachment/detachment member 70' fits into the hole 56' formed in the protruding part 55 of the trough-side attachment/detachment member 50'. As a result, the user can easily cause the trough-side attachment/detachment member 50' and the vibrator-side attachment/detachment member 70' to engage with one another without accurately perceiving the state of the attachment/detachment mechanism 40 by sight.

(4-9)

When the lever 65 is moved downward, the attachment/detachment mechanism 40' assumes fixed state. As a result, when the user attaches the trough 20 to the vibrator 30, the user can utilize their own body weight to move the tab 67 down, which facilitates attaching the trough 20.

(4-10)

In the fixed state, the three protuberances 76' of the vibrator-side attachment/detachment member 70' support the second flat part 53 of the trough-side attachment/detachment member 50' at three points. The orientation of the second flat part 53 is thereby stabilized because these three points definitively establish a flat plane.

Third Embodiment (1) Configuration

Figure 13:
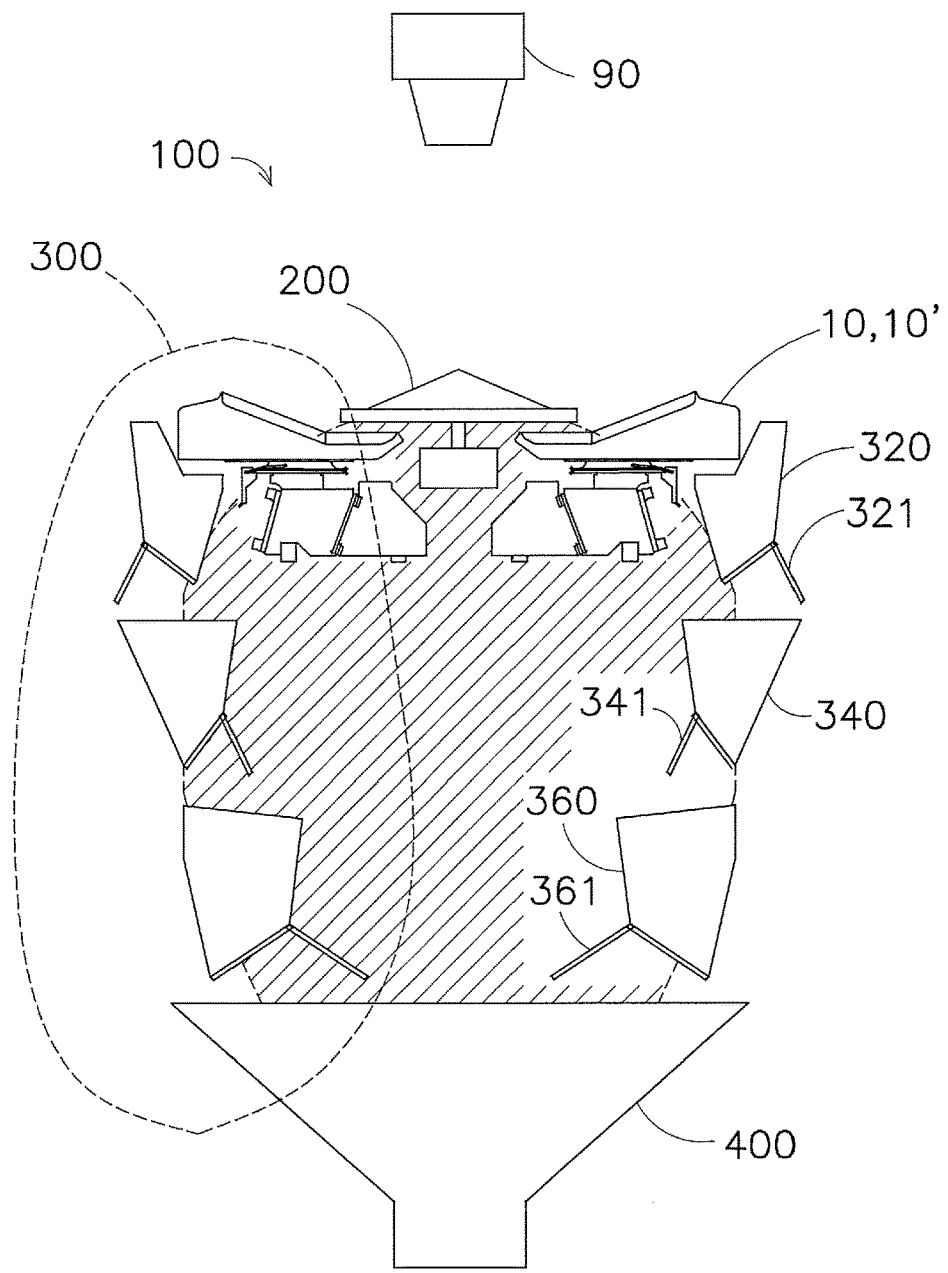
FIG. 13 is a schematic diagram showing a combination weighing apparatus according to a third embodiment of the present invention.

FIG. 13 shows a combination weighing apparatus 100 according to a third embodiment of the present invention. The combination weighing apparatus 100 is equipped with a plurality of the vibratory conveying apparatuses 10, 10' according to any of the embodiments or modifications heretofore described. The combination weighing apparatus 100 receives articles from an external article supply unit 90, and from the received articles, separates and discharges an amount of articles with a weight approximating a pre-established target weight. The articles handled by the combination weighing apparatus 100 are normally aggregates of small pieces, granular materials, or the like; e.g., snack foods, cut vegetables, etc.

The combination weighing apparatus 100 has a dispersing feeder 200, a plurality of heads 300 arranged in a radial formation, and a collecting chute 400. The articles supplied to the combination weighing apparatus 100 are distributed to the plurality of heads 300 by the dispersing feeder 200. Each head 300 has a pool hopper 320 with a gate 321, a weighing hopper 340 with a gate 341, and a booster hopper 360 with a gate 361, into which the articles are pooled. The pool hopper 320 delivers the pooled articles to the weighing hopper 340. The weighing hopper 340 measures the weight of the pooled articles and delivers them to the booster hopper 360. The booster hopper 360 delivers the pooled articles to the collecting chute 400. An unillustrated control circuit stores the weights of the pooled articles as pertaining to the plurality of weighing hoppers 340 and the plurality of booster hoppers 360, and determines a combination by selecting some among these hoppers. This combination is an optimal combination with which the total weight of pooled articles from the selected one or more hoppers is the nearest to the target weight. Finally, the gates 341, 361 of the weighing hoppers 340 and the booster hoppers 360 according to the determined combination are opened, and the articles pooled therein are discharged from the collecting chute 400.

Each head 300 has a vibratory conveying apparatus 10, 10' described above, by which the articles are conveyed from the dispersing feeder 200 to the pool hopper 320.

With this configuration, in the combination weighing apparatus 100, the trough 20 does not readily lose positional alignment relative to the vibrator 30.

(2) Modifications

In the combination weighing apparatus 100 described above, a plurality of heads 300 including respective vibratory conveying apparatuses 10, 10' are arranged in a radial formation, but the plurality of heads 300 may be arranged linearly, as with the combination weighing apparatus disclosed in Patent Literature 2 (Japanese Laid-open Patent Publication No. 2010-38845).

REFERENCE SIGNS LIST

10, 10' Vibratory conveying apparatus
20 Trough
21 Trough bottom plate
30 Vibrator
31 Electromagnet
32 Plate spring
33 Vibrating part
40, 40' Attachment/detachment mechanism
41, 41' Upstream attachment/detachment engaging part
42, 42' Downstream attachment/detachment engaging part
50, 50' Trough-side attachment/detachment member
70 Vibrator-side attachment/detachment member
70A Vibrator-side attachment/detachment member
70B Vibrator-side attachment/detachment member
70' Vibrator-side attachment/detachment member
80 Bolt
100 Combination weighing apparatus
F Conveying direction
V Vibrational direction

CITATION LIST

Patent Literature

Patent Literature 1: Japanese Laid-open Patent Publication No. 7-285637
Patent Literature 2: Japanese Laid-open Patent Publication No. 2010-38845

The invention claimed is:

1. A vibratory conveying apparatus comprising:
a trough for conveying articles from an upstream side to a downstream side;
a vibrator for vibrating said trough; and
an attachment/detachment mechanism for attaching and detaching said trough and said vibrator;
said attachment/detachment mechanism having:
a trough-side attachment/detachment member which is secured to said trough and which has a trough-side upstream engaging part disposed on said upstream side and a trough-side downstream engaging part disposed on said downstream side;
a vibrator-side attachment/detachment member, which is secured to said vibrator and which has a vibrator-side upstream engaging part disposed on said upstream side and a vibrator-side downstream engaging part disposed on said downstream side; and
a lever configured to be moved up and down to switch between a fixed state in which said trough-side attachment/detachment member and said vibrator-side attachment/detachment member are fixed to each other, and a separated state in which said trough-side attachment/detachment member and said vibrator-side attachment/detachment member are separated from each other; and
at least one of the following:
said trough-side upstream engaging part being disposed at a peripheral free end of said trough-side attachment/detachment member on said upstream side and said vibrator-side upstream engaging part being disposed at a peripheral free end of the vibrator-side attachment/detachment member on said upstream side; and
said trough-side downstream engaging part being disposed at a peripheral free end of said trough-side attachment/detachment member on said downstream side and said vibrator-side downstream engaging part being disposed at a peripheral free end of said vibrator-side attachment/detachment member on said downstream side;
said trough-side upstream engaging part and said vibrator-side upstream engaging part engaging with one another to configure an upstream attachment/detachment engaging part; and said trough-side downstream engaging part and said vibrator-side downstream engaging part engaging with one another to configure a downstream attachment/detachment engaging part.

2. The vibratory conveying apparatus according to claim 1, further comprising;
a pulling member, which extends in a direction joining said upstream attachment/detachment engaging part and said downstream attachment/detachment engaging part, and which is linked to said lever.

3. The vibratory conveying apparatus according to claim 1, wherein
of said trough-side attachment/detachment member and said vibrator-side attachment/detachment member:
one is a recessed-surface member having a recessed surface;
the other has a sliding part that slides on said recessed surface during attaching and detaching; and
said sliding part is one of said trough-side upstream engaging part, said vibrator-side upstream engaging part, said trough-side downstream engaging part, and said vibrator-side downstream engaging part.

4. The vibratory conveying apparatus according to claim 3, wherein
said recessed-surface member has an accommodating part for accommodating said sliding part.

5. The vibratory conveying apparatus according to claim 1, wherein
said lever is configured to be moved down to switch said separated state to said fixed state.

6. The vibratory conveying apparatus according to claim 1, wherein
said lever is disposed farther toward said downstream side than said vibrator.

7. The vibratory conveying apparatus according to claim 1, wherein
of said trough-side attachment/detachment member and said vibrator-side attachment/detachment member:
one has three protuberances; and
the other has a flat part.

8. The vibratory conveying apparatus according to claim 1, wherein
said lever is formed with an eccentric cam.

9. A combination weighing apparatus comprising:
a plurality of the vibratory conveying apparatuses according to claim 1.

10. The vibratory conveying apparatus according to claim 1, further comprising:
an elastic member for urging said lever either up or down, depending on the position of said lever.

11. The vibratory conveying apparatus according to claim 10, wherein
said lever is moved down to switch said separated state to said fixed state.

12. The vibratory conveying apparatus according to claim 10, wherein
between said trough-side attachment/detachment member and said vibrator-side attachment/detachment member:
one has three protuberances; and
the other has a flat part.

13. The vibratory conveying apparatus according to claim 10, wherein
said elastic member and said lever are attached to said trough-side attachment/detachment member.

14. The vibratory conveying apparatus according to claim 10, wherein
in said fixed state, said trough-side attachment/detachment member is pressed against said vibrator-side attachment/detachment member in said upstream attachment/detachment engaging part and said downstream attachment/detachment engaging part.

15. The vibratory conveying apparatus according to claim 10, wherein
of said trough-side attachment/detachment member and said vibrator-side attachment/detachment member:
one is a recessed-surface member having a recessed surface;
the other has a sliding part that slides on said recessed surface during attaching and detaching; and
said sliding part is one of said trough-side upstream engaging part, said vibrator-side upstream engaging part, said trough-side downstream engaging part, or said vibrator-side downstream engaging part.

16. The vibratory conveying apparatus according to claim 15, wherein said recessed-surface member has a hole for accommodating said sliding part.

17. A vibratory conveying apparatus comprising:
a trough for conveying articles from an upstream side to a downstream side;
a vibrator for vibrating said trough;
an attachment/detachment mechanism for attaching and detaching said trough and said vibrator, said attachment/detachment mechanism having:
a trough-side attachment/detachment member which is secured to said trough and which has a trough-side upstream engaging part disposed on said upstream side and a trough-side downstream engaging part disposed on said downstream side;
a vibrator-side attachment/detachment member, which is secured to said vibrator and which has a vibrator-side upstream engaging part disposed on said upstream side and a vibrator-side downstream engaging part disposed on said downstream side; and
a lever configured to be moved up and down to switch between a fixed state in which said trough-side attachment/detachment member and said vibrator-side attachment/detachment member are fixed to each other, and a separated state in which said trough-side attachment/detachment member and said vibrator-side attachment/detachment member are separated from each other;
said trough-side upstream engaging part and said vibrator-side upstream engaging part engaging with one another to configure an upstream attachment/detachment engaging part; and
said trough-side downstream engaging part and said vibrator-side downstream engaging part engaging with one another to configure a downstream attachment/detachment engaging part; and
an elastic member for urging said lever either up or down, depending on the position of said lever, said elastic member being a linear member having a bend.

18. The vibratory conveying apparatus according to claim 17, wherein
said lever is disposed on an article-conveying centerline;
said bend has a first bend part and a second bend part; and
said first bend part and said second bend part are disposed to either side of said article-conveying centerline.

19. The vibratory conveying apparatus according to claim 17, wherein said bend is a straight line in plan view and is bent in side view.

20. A vibratory conveying apparatus comprising:
- a trough for conveying articles from an upstream side to a downstream side;
- a vibrator for vibrating said trough;
- an attachment/detachment mechanism for attaching and detaching said trough and said vibrator, said attachment/detachment mechanism having:
  - a trough-side attachment/detachment member which is secured to said trough and which has a trough-side upstream engaging part disposed on said upstream side and a trough-side downstream engaging part disposed on said downstream side;
  - a vibrator-side attachment/detachment member, which is secured to said vibrator and which has a vibrator-side upstream engaging part disposed on said upstream side and a vibrator-side downstream engaging part disposed on said downstream side; and
  - a lever attached to said trough-side attachment/detachment member, said lever being configured to be moved up and down to switch between a fixed state in which said trough-side attachment/detachment member and said vibrator-side attachment/detachment member are fixed to each other, and a separated state in which said trough-side attachment/detachment member and said vibrator-side attachment/detachment member are separated from each other;
  - said trough-side upstream engaging part and said vibrator-side upstream engaging part engaging with one another to configure an upstream attachment/detachment engaging part; and
  - said trough-side downstream engaging part and said vibrator-side downstream engaging part engaging with one another to configure a downstream attachment/detachment engaging part; and
- an elastic member for urging said lever either up or down, depending on the position of said lever.

* * * * *